(12) United States Patent
Son et al.

(10) Patent No.: US 9,494,231 B2
(45) Date of Patent: Nov. 15, 2016

(54) HYDRAULIC PRESSURE SUPPLY SYSTEM OF AUTOMATIC TRANSMISSION

(71) Applicant: Hyundai Motor Company, Seoul (KR)

(72) Inventors: Hyunjun Son, Seoul (KR); Sehwan Jo, Bucheon-Si (KR)

(73) Assignee: Hyundai Motor Company, Seoul (KR)

( * ) Notice: Subject to any disclaimer, the term of this patent is extended or adjusted under 35 U.S.C. 154(b) by 59 days.

(21) Appl. No.: 14/562,329

(22) Filed: Dec. 5, 2014

(65) Prior Publication Data

US 2016/0003348 A1 Jan. 7, 2016

(30) Foreign Application Priority Data

Jul. 1, 2014 (KR) .................. 10-2014-0082015

(51) Int. Cl.
*G05D 11/02* (2006.01)
*F16H 61/00* (2006.01)
(Continued)

(52) U.S. Cl.
CPC ...... *F16H 61/0031* (2013.01); *F16H 61/0276* (2013.01); *F16K 11/06* (2013.01); *G05D 16/2013* (2013.01); *F16H 2061/0037* (2013.01)

(58) Field of Classification Search
CPC .............. F16H 61/0031; F16K 11/06; G05D 16/2013; Y10T 137/85986; Y10T 137/86002; Y10T 137/8601; Y10T 137/86059; Y10T 137/8671; Y10T 137/2263; Y10T 137/265
(Continued)

(56) References Cited

U.S. PATENT DOCUMENTS 6,196,806 B1 3/2001 Van Der Sluis
6,296,019 B1 * 10/2001 Muller ............... F16F 15/1207
137/625.66

(Continued)

FOREIGN PATENT DOCUMENTS

JP       2009-287688 A   12/2009
KR   10-2012-0037623 A    4/2012
KR   10-2014-0079131 A    6/2014

*Primary Examiner* — Craig Schneider
*Assistant Examiner* — Minh Le
(74) *Attorney, Agent, or Firm* — Morgan, Lewis & Bockius LLP

(57) ABSTRACT

A hydraulic pressure supply system of an automatic transmission may include a low-pressure oil pump generating low hydraulic pressure while being driven by an engine to exhaust the low hydraulic pressure to a first low-pressure channel, a high-pressure oil pump raising a portion of the hydraulic pressure in the first low-pressure channel to a high pressure while being driven by an electric motor to exhaust the hydraulic pressure to a first high-pressure channel, a low-pressure regulator valve controlling the hydraulic pressure while exhausting a portion of the hydraulic pressure to supply the controlled hydraulic pressure to a low-pressure part through a second low-pressure channel, and a high-pressure regulator valve controlling the hydraulic pressure while re-circulating a portion of the hydraulic pressure to the low-pressure part through single or two re-circulation channels according to the pressure to supply the controlled hydraulic pressure to a high-pressure part through the second high-pressure channel.

3 Claims, 3 Drawing Sheets

(51) Int. Cl.
*F16K 11/06* (2006.01)
*G05D 16/20* (2006.01)
*F16H 61/02* (2006.01)

(58) Field of Classification Search
USPC ............ 137/565.11, 565.13, 565.14, 565.19, 137/118.06, 118.01, 625.69; 91/227, 222, 91/422
See application file for complete search history.

(56) References Cited

U.S. PATENT DOCUMENTS

| | | | |
|---|---|---|---|
| 8,327,884 B2* | 12/2012 | Nishimine | F16H 61/0021 137/111 |
| 9,140,254 B2* | 9/2015 | Hwang | F04B 17/03 |
| 9,206,792 B2* | 12/2015 | Wi | F16H 61/0031 |
| 9,234,578 B2* | 1/2016 | Hwang | F16H 61/38 |
| 2011/0197982 A1* | 8/2011 | Moorman | F16H 61/0031 137/565.11 |
| 2012/0085441 A1* | 4/2012 | Park | F16H 61/0025 137/565.11 |
| 2013/0133766 A1* | 5/2013 | Hwang | F16H 61/0021 137/565.13 |
| 2013/0269802 A1* | 10/2013 | Hwang | F16H 61/00 137/565.19 |
| 2014/0060676 A1* | 3/2014 | Wi | F16H 61/0021 137/565.01 |
| 2014/0064990 A1* | 3/2014 | Jo | F16H 61/0031 417/253 |
| 2014/0158236 A1* | 6/2014 | Jo | F16H 61/0021 137/565.13 |
| 2014/0290767 A1* | 10/2014 | Jo | F16H 61/0206 137/565.11 |
| 2015/0027570 A1* | 1/2015 | Wi | F16H 61/0021 137/563 |
| 2015/0167835 A1* | 6/2015 | Hwang | F16H 61/0031 137/565.14 |

* cited by examiner

HYDRAULIC PRESSURE SUPPLY SYSTEM OF AUTOMATIC TRANSMISSION

CROSS-REFERENCE TO RELATED APPLICATION

The present application claims priority to and the benefit of Korean Patent Application No. 10-2014-0082015 filed on Jul. 1, 2014, the entire contents of which is incorporated herein for all purposes by this reference.

BACKGROUND OF THE INVENTION

Field of the Invention

The present invention relates to a hydraulic pressure supply system of an automatic transmission. More particularly, the present invention relates to a hydraulic pressure supply system of an automatic transmission capable of detecting a pressure exhausted from a high-pressure regulator valve to control an electric motor at an optimal revolution per minute (rpm).

Description of Related Art

Recently, as oil price has increased and exhaust gas emission regulations, or the like, have gradually been strengthened in the world, auto-makers are going-all out to develop a technology capable of improving fuel efficiency by an eco-friendly method.

Fuel efficiency in an automatic transmission may be improved by minimizing unnecessary consumption power of an oil pump.

As described above, in order to improve fuel efficiency, recently, an oil pump applied to automatic transmission is separately composed of a low-pressure oil pump and a high-pressure oil pump, such that hydraulic pressure generated in the low-pressure oil pump is supplied to a low-pressure part (a torque converter, a cooling part, a lubrication part), and hydraulic pressure generated in the high-pressure oil pump is supplied to a high-pressure part (a friction member selectively acting at the time of shifting).

That is, the automatic transmission including two oil pumps as described above is configured so that entire hydraulic pressure is generated based on the low-pressure part, and at the same time, only some of the hydraulic pressure is controlled to a high pressure required in the high-pressure part to thereby be supplied.

However, in a hydraulic pressure supply system according to the related art, since only whether or not a target pressure is reached is detected without detecting an excess flow, it is impossible to control the electric motor at an optimal RPM.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic pressure supply system of an automatic transmission capable of controlling an electric motor in a hydraulic pressure supply system of an automatic transmission including two oil pumps applied thereto so as to optimize a flow using information provided from one pressure sensor and minimizing an unnecessary flow loss at a high RPM to improve transmission efficiency.

An aspect of the present invention provides a hydraulic pressure supply system of an automatic transmission including a low-pressure oil pump generating low hydraulic pressure from oil stored in an oil pan while being driven by an engine to exhaust the generated low hydraulic pressure to a first low-pressure channel, a high-pressure oil pump raising a portion of the hydraulic pressure in the first low-pressure channel to a high pressure while being driven by an electric motor to exhaust the raised hydraulic pressure to a first high-pressure channel, a low-pressure regulator valve controlling the hydraulic pressure while exhausting a portion of the hydraulic pressure supplied through the first low-pressure channel to supply the controlled hydraulic pressure to a low-pressure part through a second low-pressure channel, and a high-pressure regulator valve controlling the hydraulic pressure while re-circulating a portion of the hydraulic pressure supplied through the first high-pressure channel to the low-pressure part through a single re-circulation channel or two re-circulation channels according to the pressure to supply the controlled hydraulic pressure to a high-pressure part through the second high-pressure channel.

In addition, the high-pressure regulator valve may include a valve body including a first port supplied with the hydraulic pressure from the first high-pressure channel, a second port supplying the hydraulic pressure supplied to the first port to the second high-pressure channel, a third port supplying a portion of the hydraulic pressure supplied to the first port to a first re-circulation channel, a fourth port supplying a portion of the hydraulic pressure supplied to the first port to a second re-circulation channel, a fifth port supplied with a portion of the hydraulic pressure supplied to the second port as control pressure, and a sixth port positioned at a portion opposite to the fifth port to be supplied with control pressure of a solenoid value, and a valve spool including a first land on which the control pressure supplied to the fifth port acts, a second land controlling an open area of the third port, a third land controlling open areas of the first and second ports and the third port, a fourth land controlling open areas of the first and second ports and the fourth port, and a fifth land on which the control pressure supplied to the sixth port acts.

Further, the first re-circulation channel may connect the third port of the high-pressure regulator valve and the first low-pressure channel and may include an orifice disposed on the channel, and the second re-circulation channel may connect the fourth port of the high-pressure regulator valve and the second low-pressure channel.

Furthermore, a pressure sensor may be provided on the first re-circulation channel between the orifice and the high-pressure regulator valve.

According to an embodiment of the present invention, an unnecessary flow loss at a high RPM may be minimized and transmission efficiency may be improved by controlling the electric motor so as to optimize a flow using information provided by one pressure sensor in a hydraulic pressure supply system of an automatic transmission to which two oil pumps are applied.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
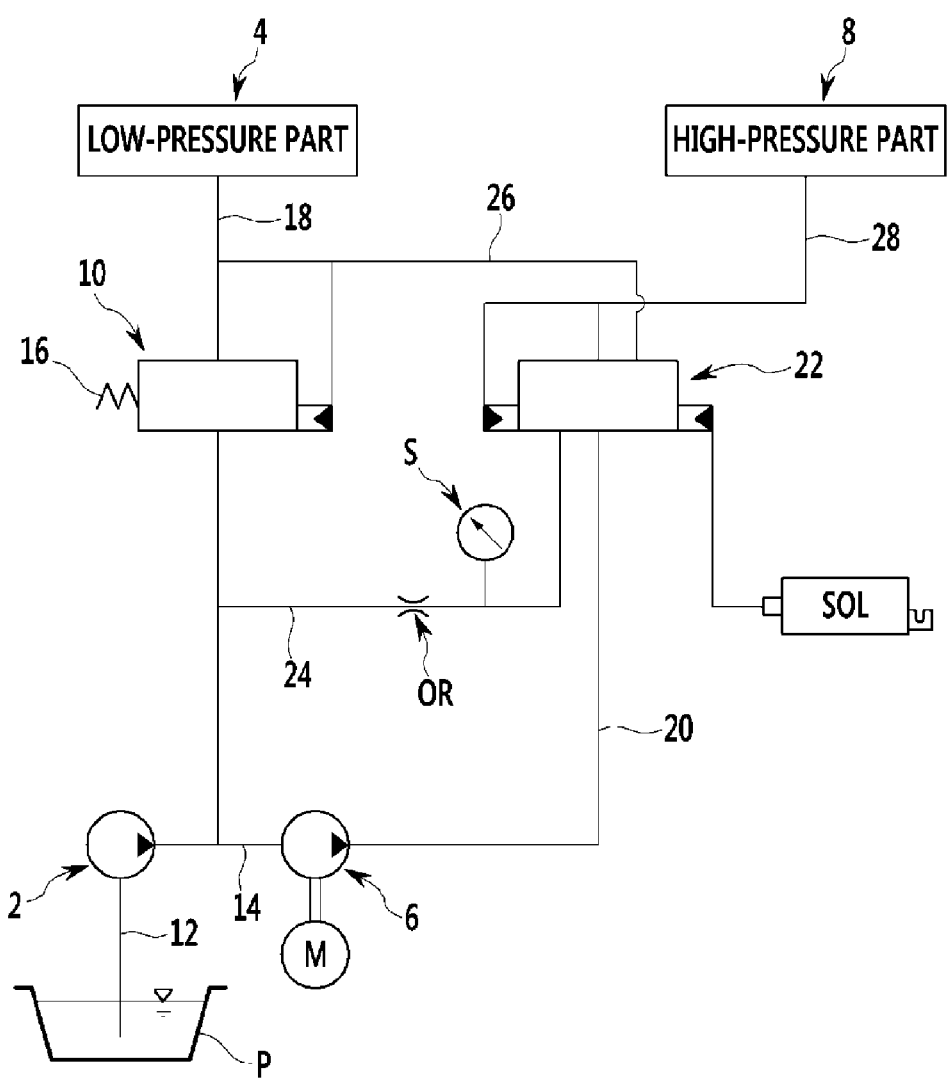
FIG. 1 is a configuration diagram of a hydraulic pressure supply system of an automatic transmission according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiment of the present invention will be described in detail with reference to the accompanying drawings.

However, in order to clarify the present invention, parts that are not connected with the description will be omitted.

The use of the terms first, second, etc. are used to distinguish one element from another, and are not limited to the order in the following description.

FIG. 1 is a configuration diagram of a hydraulic pressure supply system of an automatic transmission according to an exemplary embodiment of the present invention.

Referring to FIG. 1, the hydraulic pressure supply system according to an exemplary embodiment of the present invention is configured so as to supply low hydraulic pressure generated in a low-pressure oil pump 2 to a low-pressure part 4 such as a torque converter, a cooling part, a lubrication part, or the like, and supply high hydraulic pressure generated in a high-pressure oil pump 6 to a high-pressure part for operating a friction member associated with shift.

Here, the low hydraulic pressure means hydraulic pressure controlled to a low pressure enough to smoothly operate, cool, and lubricate the torque converter (T/C) to thereby be supplied, and the high hydraulic pressure means hydraulic pressure controlled to a high pressure enough to smoothly operate a plurality of friction members selectively operating at the time of shift to thereby be supplied.

The hydraulic pressure generated in the low-pressure oil pump 2 is controlled to a stable hydraulic pressure in a low-pressure regulator valve 10 to thereby be supplied to the low-pressure part 4, and the low-pressure oil pump 2 is connected to an oil pan P through a suction channel 12, and the low hydraulic pressure generated by the low-pressure oil pump 2 is exhausted to a first low-pressure channel 14.

The low-pressure oil pump 2 is formed of a mechanical pump driven by rotational power of an engine as known in the art, and the low-pressure regulator valve 10 controls the hydraulic pressure while re-circulating the hydraulic pressure supplied through the first low-pressure channel 14 to the suction channel 12 or discharging the hydraulic pressure.

Here, the low-pressure regulator valve 10 may be controlled by complementary interaction between some of the hydraulic pressure of the high-pressure part 8 and elastic force of an elastic member 16 that act on portions opposite to each other, or controlled by some of the hydraulic pressure of the high-pressure part 8 or elastic force of the elastic member 16.

In addition, the hydraulic pressure controlled in the low-pressure regulator valve 10 is supplied to the low-pressure part 4 through a second low-pressure channel 18.

The high-pressure oil pump 6 is formed of an electric pump driven by an electric motor M and raises low hydraulic pressure supplied through the first low-pressure channel 14 to a high pressure to thereby exhaust the raised hydraulic pressure to a first high-pressure channel 20.

In addition, the hydraulic pressure exhausted from the high-pressure oil pump 6 to the first high-pressure channel 20 is controlled to a stable high hydraulic pressure in a high-pressure regulator valve 22 to thereby be supplied to the high-pressure part 8.

The high-pressure regulator valve 22 may be controlled by some of the hydraulic pressure of the high-pressure part 8 and control pressure of a solenoid value (SOL) that act on portions opposite to each other depending on re-circulated or exhausted hydraulic pressure.

In addition, first and second recirculation channels 24 and 26 are connected to the high-pressure regulator valve 22 in order to re-circulate or exhaust the hydraulic pressure supplied through the first high-pressure channel 20, wherein a pressure sensor S is disposed on the first re-circulation channel 24, and an orifice OR is disposed in a downstream side of the pressure sensor S.

Therefore, it is possible to the hydraulic pressure supplied to the high-pressure part 8 from being excessively increased by controlling the electric motor driving the high-pressure oil pump 6 simultaneously with controlling the solenoid value SOL depending on hydraulic pressure of the first re-circulation channel 24 detected in the pressure sensor S.

In addition, the hydraulic pressure controlled in the high-pressure regulator valve 22 is supplied to the high-pressure part 8 through a second high-pressure channel 28.

Although the case in which the first re-circulation channel 24 is connected to the first low-pressure channel 14 and the second re-circulation channel 26 is connected to the second low-pressure channel 18 is shown in FIG. 1, this case is shown by way of example of the case in which the hydraulic pressure exhausted from the high-pressure regulator valve 22 is re-circulated toward the low-pressure part, but the present invention is not limited thereto. As another example, the hydraulic pressure exhausted from the high-pressure regulator valve 22 may be exhausted as it is.

Figure 2:
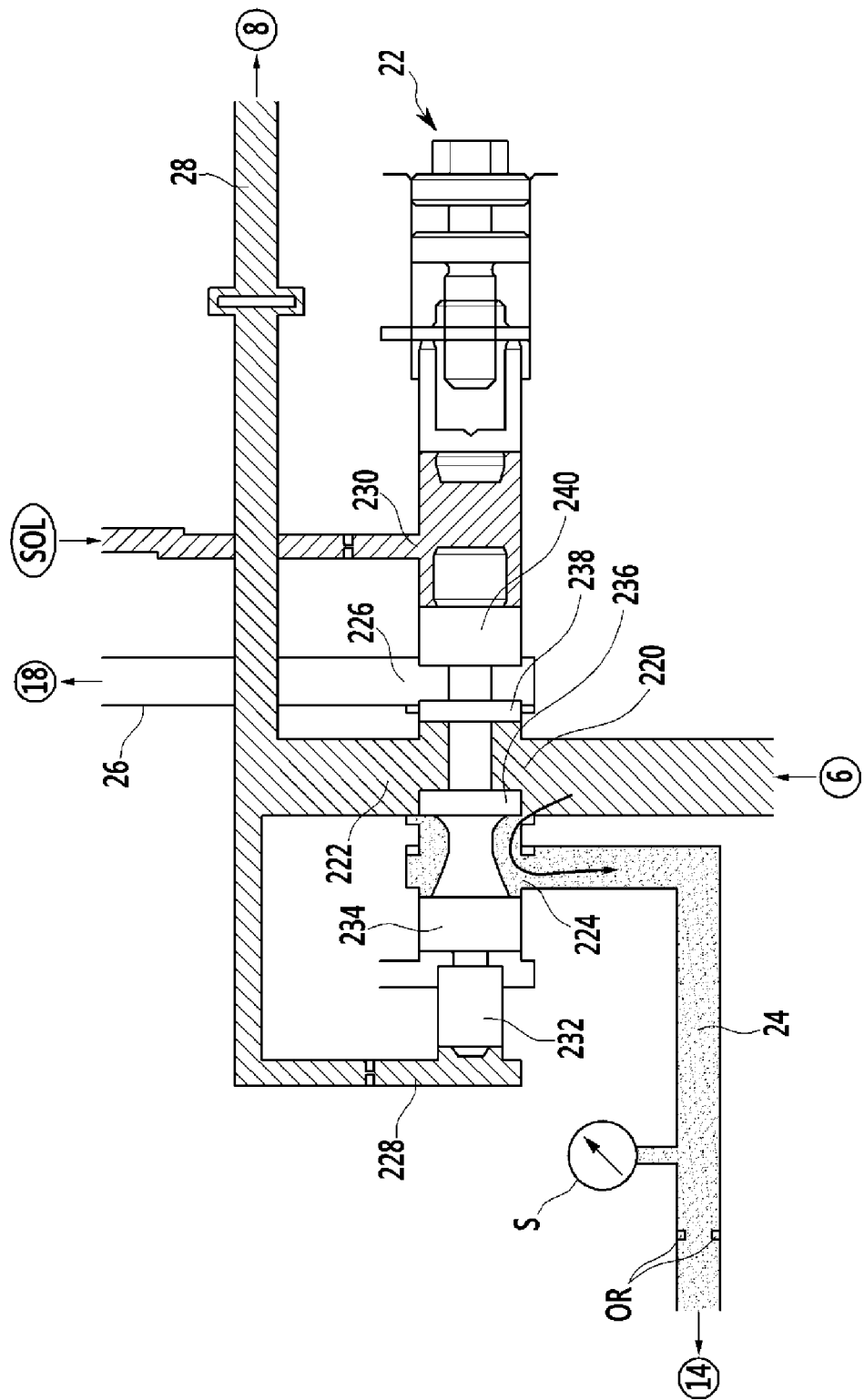
FIG. 2, which is a cross-sectional diagram of a high-pressure regulator value applied to the hydraulic pressure supply system according to an exemplary embodiment of the present invention, is a primary equilibrium state diagram.

FIG. 2, which is a cross-sectional diagram of a high-pressure regulator value applied to the hydraulic pressure supply system according to an exemplary embodiment of the present invention, is a primary equilibrium state diagram (approximately 16 bars).

Referring to FIG. 2, the high-pressure regulator valve 22, which is a spool valve, includes a valve body and a valve spool slidably disposed in a horizontal direction in the valve body.

Here, the valve body includes a first port 220 supplied with the hydraulic pressure from the first high-pressure channel 20, a second port 222 supplying the hydraulic pressure supplied to the first port 220 to the second high-pressure channel 28, a third port 224 supplying some of the hydraulic pressure supplied to the first port 220 to the first re-circulation channel 24, a fourth port 226 supplying some of the hydraulic pressure supplied to the first port 220 to the second re-circulation channel 26, a fifth port 228 supplied with some of the hydraulic pressure supplied to the second port 222 as control pressure, and a sixth port 230 positioned at a portion opposite to the fifth port 228 to be supplied with control pressure of the solenoid value SOL.

In addition, the valve spool includes a first land 232 on which the control pressure supplied to the fifth port 228 acts, a second land 234 controlling an open area of the third port 224, a third land 236 controlling open areas of the first and second ports 220 and 222 and the third port 224, a fourth land 238 controlling open areas of the first and second ports 220 and 222 and the fourth port 226, and a fifth land 240 on which the control pressure supplied to the sixth port 230 acts.

In the high-pressure regulator valve 22, the high hydraulic pressure is supplied from the high-pressure oil pump 6 to the first port 220 by the above-mentioned configuration.

When the hydraulic pressure supplied to the first port 220 starts to be exhausted through the third port 224, hydraulic pressure is monitored in the pressure sensor S disposed on the first re-circulation channel 24. In the case in which the pressure detected in the pressure sensor S is higher than a preset value, which means a flow is excessive more than necessary, hydraulic pressure supplied to the high-pressure part 8 is controlled by controlling the solenoid valve SOL simultaneously with performing RPM down-control of the electric motor M driving the high-pressure oil pump 6.

Figure 3:
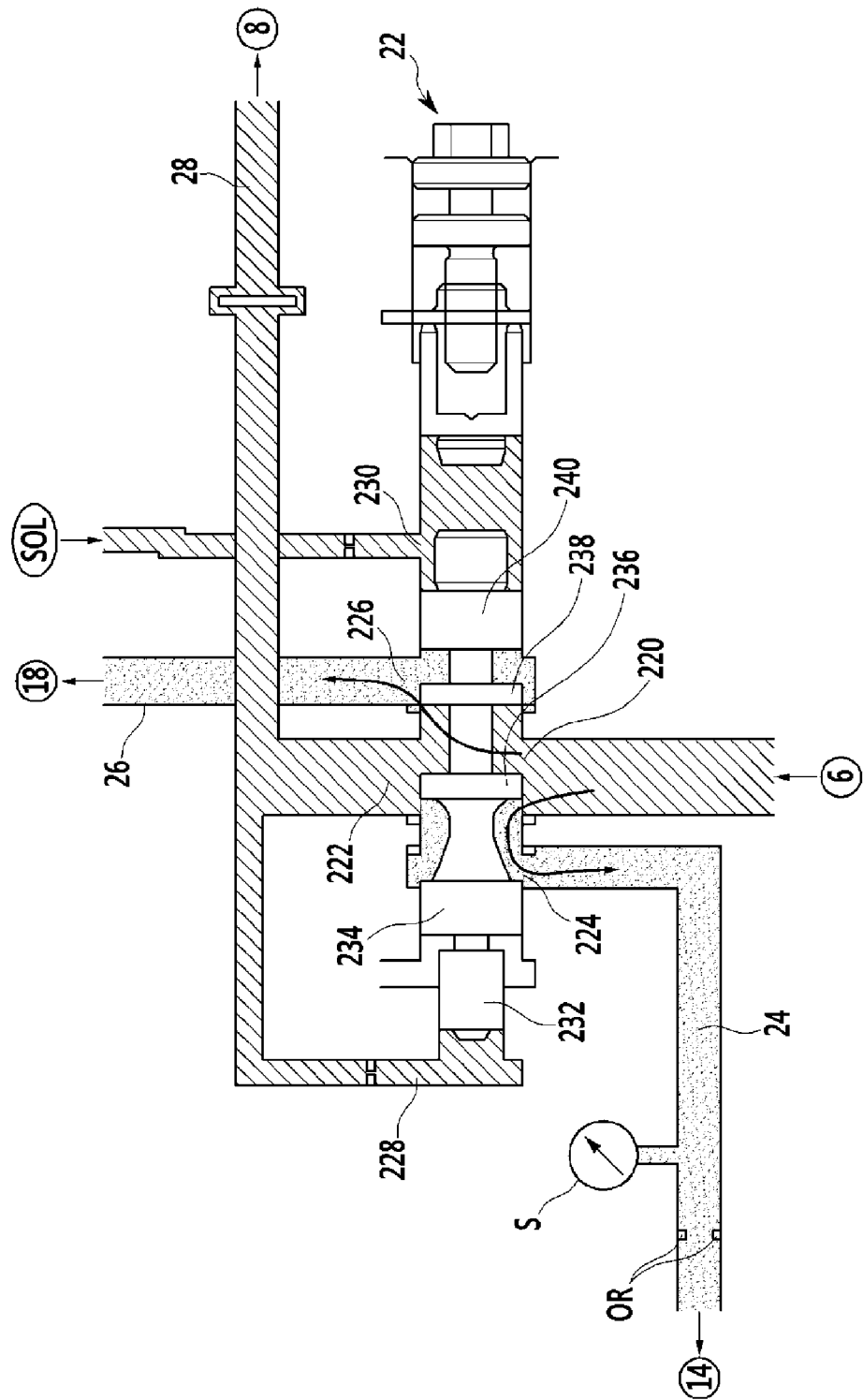
FIG. 3, which is a cross-sectional diagram of the high-pressure regulator value applied to the hydraulic pressure supply system according to an exemplary embodiment of the present invention, is a secondary equilibrium state diagram.

FIG. 3, which is a cross-sectional diagram of the high-pressure regulator value applied to the hydraulic pressure supply system according to an exemplary embodiment of the present invention, is a secondary equilibrium state diagram.

Referring to FIG. 3, at the time of an excessive increase in pressure generated when the RPM of the electric motor M driving the high-pressure oil pump 6 is incomplete during a process of controlling the hydraulic pressure in the high-pressure part 8 in a primary equilibrium state as shown in FIG. 2, excessive generation of the hydraulic pressure is suppressed by decreasing the RPM of the electric motor M.

In addition, when the pressure is increased (to approximately 16.8 bars) in spite of the RPM down control of the electric motor M as described above, a control in a secondary equilibrium state, which is a control of decreasing the hydraulic pressure by controlling the solenoid valve SOL so as to connect the first and second ports 220 and 222 to the third and fourth ports 224 and 226 to thereby re-circulating or exhausting the hydraulic pressure supplied to the first port 220 through the third and fourth ports 224 and 226, is performed.

That is, the control in the second equilibrium state is a fail-safe control for preventing an excessive increase in the pressure generated when a control of the RPM of the electric motor M is incomplete.

Further, here, the pressure sensor S may be required at the time of development, but may be omitted at the time of mass production.

As described above, the hydraulic pressure supply system according to an exemplary embodiment of the present invention may minimize an unnecessary flow loss at a high RPM by controlling the RPM of the electric motor M driving the high-pressure oil pump 6, thereby making it possible to improve transmission efficiency.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic pressure supply system of an automatic transmission, the hydraulic pressure supply system comprising:
a low-pressure oil pump generating low hydraulic pressure from oil stored in an oil pan while being driven by an engine to exhaust a generated low hydraulic pressure to a first low-pressure channel;
a high-pressure oil pump raising a portion of the generated low hydraulic pressure in the first low-pressure channel to a high hydraulic pressure while being driven by an electric motor to exhaust a raised hydraulic pressure to a first high-pressure channel;
a low-pressure regulator valve controlling the generated low hydraulic pressure while exhausting a portion of the generated low hydraulic pressure supplied through the first low-pressure channel to supply a controlled hydraulic pressure to a low-pressure part through a second low-pressure channel; and a high-pressure regulator valve controlling the raised high hydraulic pressure while re-circulating a portion of the raised high hydraulic pressure supplied through the first high-pressure channel to the low-pressure part through a single re-circulation channel or two re-circulation channels according to at least a control pressure to supply a controlled hydraulic pressure to a high-pressure part through a second high-pressure channel;
wherein the high-pressure regulator valve includes:
a valve body including:
a first port supplied with the raised high hydraulic pressure from the first high-pressure channel;
a second port supplying the raised high hydraulic pressure supplied to the first port to the second high-pressure channel;
a third port supplying a portion of the raised high hydraulic pressure supplied to the first port to a first re-circulation channel of the two re-circulation channels;
a fourth port supplying a portion of the raised high hydraulic pressure supplied to the first port to a second re-circulation channel of the two re-circulation channels;

a fifth port supplied with a portion of the raised high hydraulic pressure supplied to the second port as a first control pressure of the at least a control pressure; and a sixth port positioned at a portion of the valve body opposite to the fifth port to be supplied with a second control pressure of the at least a control pressure, wherein the second control pressure is generated by a solenoid value; and a valve spool including:

a first land on which the first control pressure supplied to the fifth port acts;

a second land controlling an open area of the third port;

a third land controlling open areas of the first and second ports and the third port;

a fourth land controlling open areas of the first and second ports and the fourth port; and a fifth land on which the second control pressure supplied to the sixth port acts.

2. The hydraulic pressure supply system of claim 1, wherein the first re-circulation channel connects the third port of the high-pressure regulator valve and the first low-pressure channel and includes an orifice disposed on the first re-circulation channel, and the second re-circulation channel connects the fourth port of the high-pressure regulator valve and the second low-pressure channel.

3. The hydraulic pressure supply system of claim 2, wherein a pressure sensor is provided on the first re-circulation channel between the orifice and the high-pressure regulator valve.

* * * * *